United States Patent
MacInnis et al.

(10) Patent No.: US 7,336,287 B2
(45) Date of Patent: Feb. 26, 2008

(54) VIDEO AND GRAPHICS SYSTEM WITH SQUARE GRAPHICS PIXELS

(75) Inventors: Alexander G. MacInnis, Los Altos, CA (US); Sheng Zhong, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 81 days.

(21) Appl. No.: 11/357,735

(22) Filed: Feb. 17, 2006

(65) Prior Publication Data

US 2006/0209086 A1    Sep. 21, 2006

Related U.S. Application Data

(63) Continuation of application No. 09/799,252, filed on Mar. 5, 2001, now Pat. No. 7,057,627.

(51) Int. Cl.
*G06T 11/60* (2006.01)
(52) U.S. Cl. ........................................ 345/636; 345/603
(58) Field of Classification Search ................. 345/204, 345/603, 629, 632, 634, 636, 638, 667, 668, 345/670, 671
See application file for complete search history.

(56) References Cited

U.S. PATENT DOCUMENTS

| | | | |
|---|---|---|---|
| 5,912,710 A * | 6/1999 | Fujimoto | 348/445 |
| 5,923,385 A | 7/1999 | Mills et al. | |
| 5,928,313 A * | 7/1999 | Thompson | 708/313 |
| 6,144,362 A | 11/2000 | Kawai | |
| 2002/0106026 A1 | 8/2002 | Demmer | |

* cited by examiner

*Primary Examiner*—Richard Hjerpe
*Assistant Examiner*—Jean Lesperance
(74) *Attorney, Agent, or Firm*—McAndrews Held & Malloy Ltd.

(57) ABSTRACT

A video and graphics system provides square graphics pixels to blend images having 640×480 pixels, such as graphics images provided by some set top boxes and intended to be displayed at a 12.27 MHz display sample rate, with images having 704×480 pixels, such as ITU-R 601 compliant images such as NTSC SDTV images, having oblong pixels and displayed at a 13.5 MHz display sample rate. A sample rate converter including a multi-phase-multi-tap filter is used to generate square pixels. The multi-phase-multi-tap filter provides a good balance of sharpness, smoothness, antialiasing and reduced ringing. The multi-phase-multi-tap filter can also be used to convert images having 320×480 pixels to images having 704×480 pixels. The multi-tap filter can be used for scan rate conversion of graphics or video images for HDTV or SDTV applications.

11 Claims, 4 Drawing Sheets

VIDEO AND GRAPHICS SYSTEM WITH SQUARE GRAPHICS PIXELS

CROSS-REFERENCE TO RELATED APPLICATIONS

This application is a continuation of U.S. patent application Ser. No. 09/799,252, filed Mar. 5, 2001, now U.S. Pat. No. 7,057,627.

The present application contains subject matter related to the subject matter disclosed in U.S. patent application Ser. No. 09/641,374 entitled "Video, Audio and Graphics Decode, Composite and Display System" filed Aug. 18, 2000, now issued as U.S. Pat. No. 6,853,385 on Feb. 8, 2005, the contents of which are hereby incorporated by reference in full.

FIELD OF THE INVENTION

The present invention relates generally to integrated circuits and systems, and more particularly to a system for processing and displaying video and graphics.

BACKGROUND OF THE INVENTION

Video images are often provided as ITU-R 601 compliant images (e.g., NTSC with 704×480 pixels) that have 13.5 MHz display sample rate. These video images typically have oblong pixels. On the other hand, graphics images are often provided with square pixels with a sample rate of 12.27 MHz. For example, a typical graphics image may have 640×480 pixels. In a video and graphics system, video and graphics are often overlaid on top of each other to provide a blended image. It is desirable to combine the video and graphics in such a way that both retain their individual and correct pixel aspect ratios. It is also desirable to perform this function without modifying the video samples or changing the sample rate of the video and graphics is often difficult due to their different image sizes and pixel aspect ratios.

Prior attempts to implement similar functions have suffered from problems. For example, some previous designs produced visual artifacts in the resulting displayed graphics, such as aliasing, blurring, or ringing. Others, in addition to these problems, have slow performance due to their additional accesses to shared memory.

Therefore, it is desirable to provide a method and apparatus for overlaying video and graphics to generate a blended image without appreciable image quality degradation, in such a way that both retain their individual and correct pixel aspect ratios without modifying the video samples or changing the video sample rate.

SUMMARY OF THE INVENTION

In one embodiment of the present invention, a video and graphics system is provided. The video and graphics system has first and second inputs. The first input is used to receive a graphics image. The graphics image contains graphics pixels, which have square pixel aspect ratio. The second input is used to receive a video image containing video pixels, which have non-square pixel aspect ratio. The video image has a larger number of pixels per scan line than the graphics image. The video and graphics system includes a sample rate converter for converting sample rate of the graphics image so that the number of graphics pixels per scan line of the graphics image becomes greater than or equal to the number of video pixels per scan line of the video image. Further, the video and graphics system includes a video compositor for blending the graphics image with the video image. The graphics image is scaled horizontally so that the graphics image can be overlaid on the full width of the video image, and the square pixel aspect ratio of the graphics pixels is maintained.

In another embodiment of the present invention, a method of blending a graphics image with a video image is provided. The graphics image containing graphics pixels having square pixel aspect ratio is received. The video image containing video pixels having non-square pixel aspect ratio is also received. The video image has a larger number of pixels per scan line than the graphics image. A sample rate of the graphics image is converted so that the number of graphics pixels per scan line of the graphics image becomes greater than or equal to the number of video pixels per scan line of the video image. Then, the graphics image is blended with the video image. The graphics image is scaled horizontally so that the graphics image can be overlaid on the full width of the video image, and the square pixel aspect ratio of the graphics pixels is maintained.

In yet another embodiment of the present invention, a video and graphics system is provided. The video and graphics system has first input means for receiving a graphics image containing graphics pixels, which have pixel aspect ratio. The video and graphics system also has second input means for receiving a video image comprising video pixels, which have non-square pixel aspect ratio. The video image has a larger number of pixels per scan line than the graphics image. The video and graphics system includes means for converting sample rate of the graphics image so that the number of graphics pixels per scan line of the graphics image becomes greater than or equal to the number of video pixels per scan line of the video image. Further, the video and graphics system includes means for blending the graphics image with the video image. The graphics image is scaled horizontally so that the graphics image can be overlaid on the full width of the video image, and the square pixel aspect ratio of the graphics pixels is maintained.

BRIEF DESCRIPTION OF THE DRAWINGS

These and other aspects of the invention may be understood by reference to the following detailed description, taken in conjunction with the accompanying drawings, which are briefly described below.

DETAILED DESCRIPTION

One embodiment of the present invention is a video and graphics system with square graphics pixels. In this embodiment, the display sample rate of graphics images preferably is converted to match the display sample rate of video images so as to facilitate blending the two, while maintaining a square pixel aspect ratio. Displayed graphics images are scaled along the horizontal axis. For example, a 640×480 graphics image is scaled to match the 704×480 image size of NTSC-compatible video, such that both the video and graphics fill the same area on the display. In other embodiments, the display sample rate of the video images may be converted to match the display sample rate of the graphics images. In still other embodiments, the display sample rate of the both the video images and the graphics images may be converted.

Figure 1:
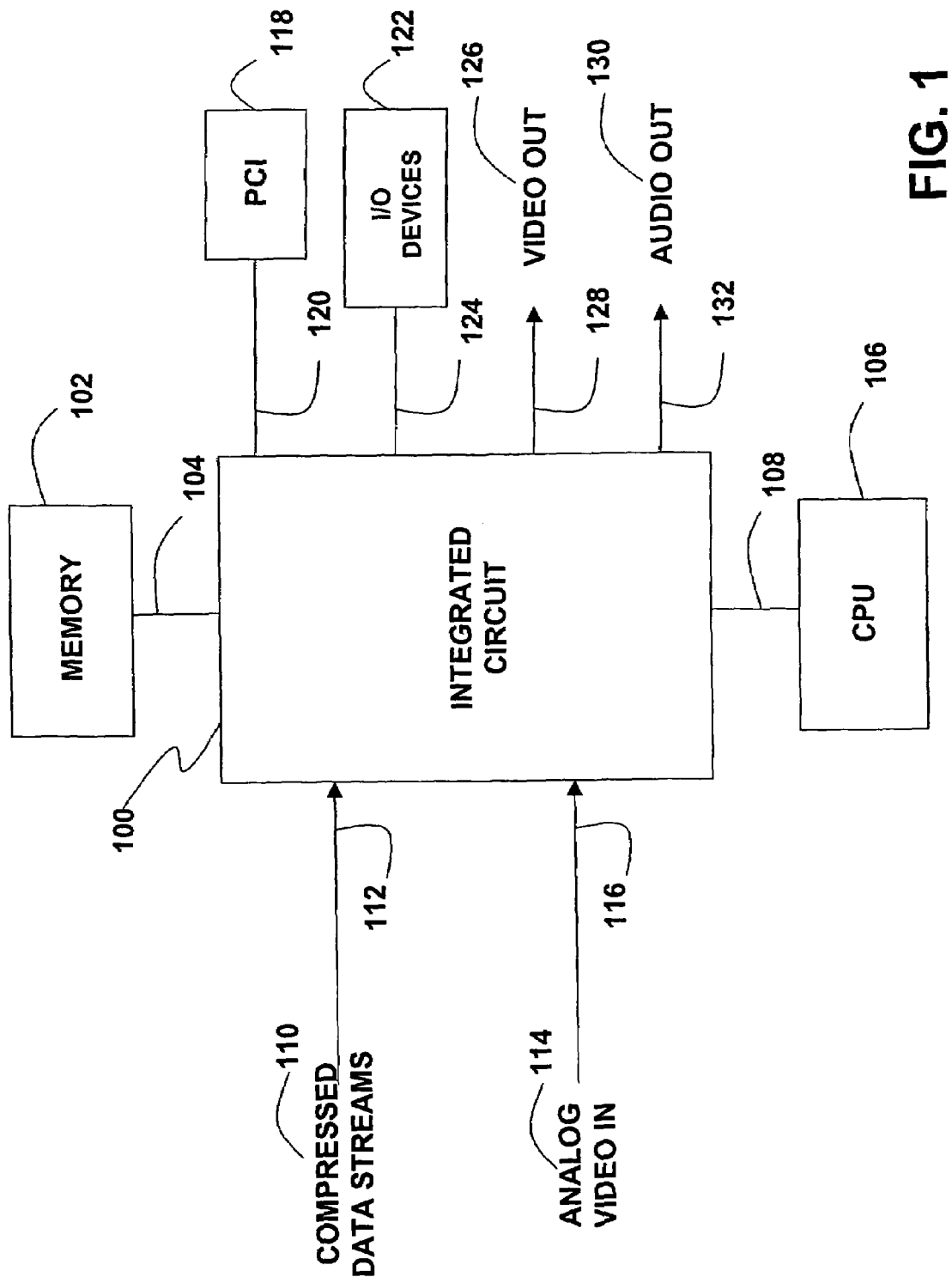
FIG. 1 is a block diagram of an integrated circuit chip, which embodies the video and graphics system of the present invention, coupled to the CPU and other devices.

In FIG. 1, an integrated circuit 100 includes one embodiment of the video and graphics system according to the present invention. In other embodiments, the system may be implemented using two or more separate integrated circuit chips. The integrated circuit 100 may include inputs 112 for receiving multiple compressed data streams. The compressed data streams may include but are not limited to MPEG-2 Transport streams. The integrated circuit 100 may also include an analog input 116 for receiving analog video signals 114. The analog video signals may include but are not limited to NTSC, PAL, Y/C (S-video), SECAM, RGB, YPrPb, YCrCb, or other analog video signals in SDTV or HDTV format that include video and/or graphics information. The color components of the graphics and video signals may be in any of a number of formats, including but not limited to, YUV, YCrCb, YPrPb, HLS, and HSV. There may be multiple definitions of each of these terms. Exemplary definitions of some of these signal formats may be found in ITU-R rec. Bt-601 and ITU-R rec. Bt-709.

The integrated circuit 100 may also include an output 128 for providing a video output signal 126, and an output 132 for providing an audio output signal 130. The video output signal 126 may include digital or analog video signals. For example, the digital video signals may include video signals to be displayed on Digital Visual Interface (DVI)-compliant monitors. The digital video signals may also be provided to an on-chip or off-chip device that may encrypt the output.

The integrated circuit 100 may also include a bus 120 for communicating with PCI devices 118 and a bus 124 to interface with I/O devices 122 such as read-only memory (ROM), flash memory and/or other devices. The integrated circuit may further include a bus 104 for transferring data to and from memory 102 and a bus 108 for connecting to a CPU 106. Graphics data for display preferably is produced by any suitable graphics library software, such as Direct Draw marketed by Microsoft Corporation, and is read from the CPU 106 into the memory 102. The memory 102 preferably is a unified memory that is shared by the system, the CPU 106 and other peripheral components. The CPU preferably uses the unified memory for its code and data while the video and graphics system preferably performs all graphics, video, audio and display functions using the same unified memory.

Figure 2:
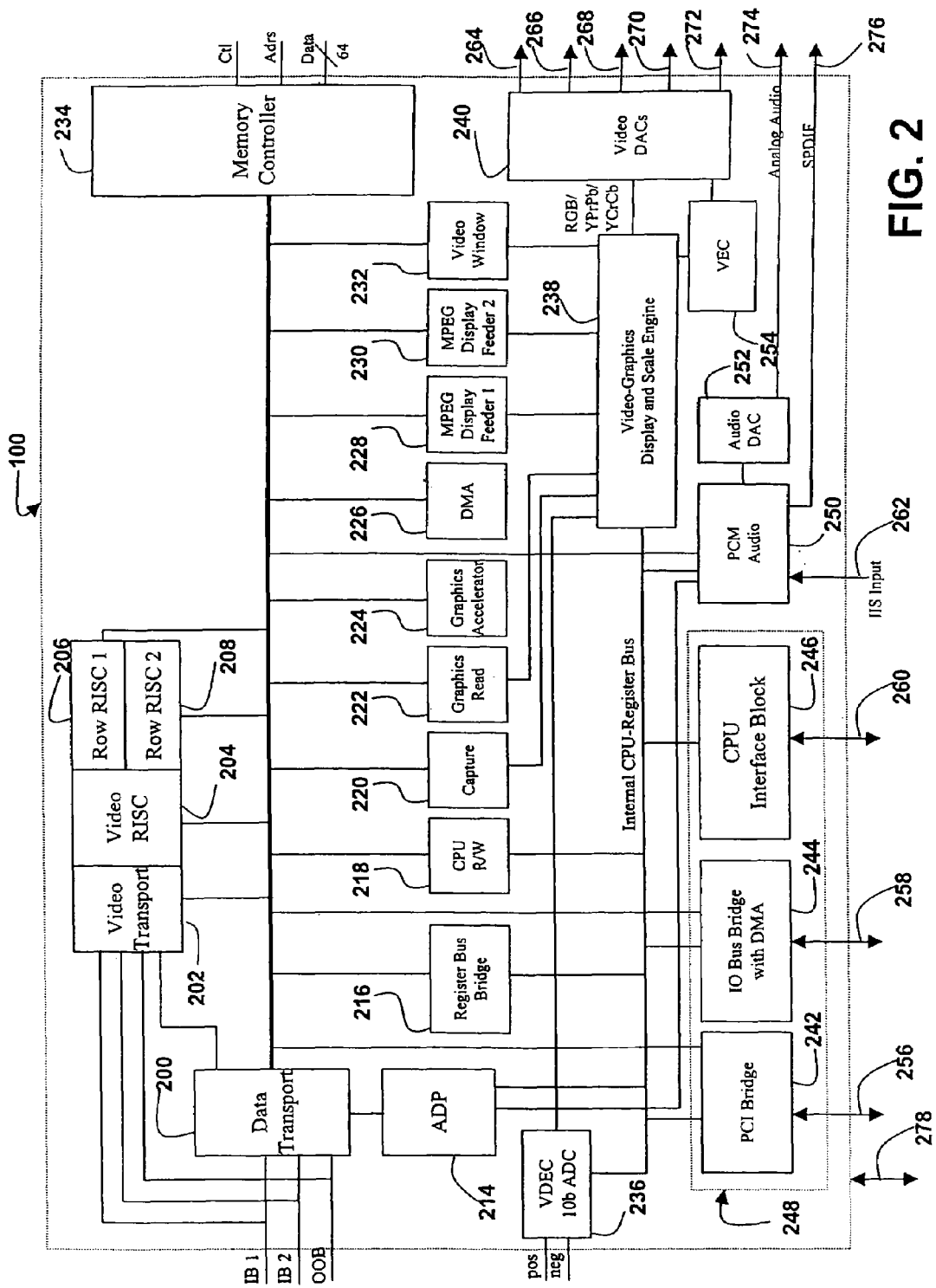
FIG. 2 is a block diagram of a video and graphics system in an embodiment according to the present invention.

FIG. 2 is a block diagram of one embodiment of the video and graphics system implemented in the integrated circuit 100. The video and graphics system preferably includes a data transport 200, a video transport 202, a video RISC 204, two row RISCs 206, 208, an audio decode processor (ADP) 214, a graphics accelerator 224, a DMA engine 226, a memory controller 234, an analog video decoder (VDEC) with a 10-bit analog-to-digital converter (ADC) 236, a video-graphics display and scale engine 238, a set of video DACs 240, a PCI bridge 242, an I/O bus bridge with DMA 244, a CPU interface block 246, a PCM audio 250, an audio DAC 252, and a video encoder (VEC) 254.

The data transport 200, the video transport 202, the video RISC 204, the row RISCs 206, 208, and the ADP 214 preferably perform transport and decode functions of the video and graphics system, which may include MPEG-2 Transport and video decoding.

The video and graphics system preferably includes multiple transport processors. For example, in one embodiment, the video and graphics system may include three transport processors. The compressed data streams, which may include in-band and out-of-band MPEG Transport streams IB 1 (in-band 1), IB 2 (in-band 2) and OOB, preferably are provided to the data transport 200 and the video transport 202.

The data transport 200 preferably performs PID and section filtering of the compressed data streams. The data transport preferably provides message data obtained through section filtering to the memory controller 234 for storage in the external memory, e.g., SDRAM. The data transport preferably also performs descrambling of encrypted transport streams. The encrypted transport streams may have been encrypted using, e.g., DES, DVD or other encryption method. In one embodiment of the present invention, the data transport provides the descrambled compressed data streams to the video transport 202 and the audio decode processor (ADP) 214.

The video transport preferably extracts bit stream for video, which may include MPEG-2 video. The video transport 202 preferably extracts compressed MPEG video data by removing transport stream (TS) headers and packetized elementary stream (PES) headers from the compressed data streams. Then the video transport preferably provides the compressed video data, which may include MPEG video data, for processing in the video RISC 204. The compressed data streams may also include other types of packetized data streams such as DIRECTV transport streams. DIRECTV is a trademark of DIRECTV, Inc.

The video RISC 204 and the row RISCs 206, 208 make up a digital video decoder, which may be an MPEG-2 video decoder. The digital video decoder preferably decodes the compressed video data and provides it to the memory controller 234 to be stored temporarily in an external memory, e.g., SDRAM. For the case of MPEG-2 video data, complex video decode process of MPEG video preferably is partitioned into concurrently operable multiple decode functionality. The digital video decoder preferably decodes multiple rows of the compressed MPEG-2 video data concurrently.

The video RISC 204 preferably parses and processes layers of compressed MPEG-2 video data above the SLICE layer, i.e., SEQUENCE, group of pictures (GOP), EXTENSION and PICTURE layers. The two row RISCs 206, 208 preferably are used for SLICE layer, macroblock layer and block layer decoding and processing. Row decode paths associated with the row RISCs preferably are used for full speed processing of time critical functions at the macroblock and block layers. Processors used in this embodiment are RISC processors. Other types of processors may be used in other embodiments.

The digital video decoder may scale frames by half when saving them to frame buffers. Thus, savings to memory size and bandwidth may result when the reference frames are saved for reconstruction of P-frames and B-frames. The frames preferably are not scaled vertically during reconstruction. The frame buffers preferably are implemented in external memory.

The ADP 214 preferably performs audio PID parsing to extract audio packets from the compressed data streams. The ADP 214 preferably decodes the audio packets extracted from the compressed data streams. The ADP 214 provides the decoded audio data to the PCM audio 250 for mixing with other audio signals.

The register bus bridge 216 preferably provides an interface between the internal CPU-register bus and the memory controller 234. In one embodiment, the system uses 16-bit registers. In other embodiments, the system may use registers having other bit sizes.

The graphics accelerator 224 preferably performs graphics operations that may require intensive CPU processing, such as operations on three dimensional graphics images. The graphics accelerator 224 preferably is implemented as a RISC processor optimized for performing real-time 3D and 2D effects on graphics and video surfaces. The graphics accelerator preferably incorporates specialized graphics vector arithmetic functions for maximum performance with video and real-time graphics. The graphics accelerator preferably performs a range of essential graphics and video operations with performance approaching that of hardwired approaches. At the same time, the graphics accelerator may be programmable so that it may meet new and evolving application requirements with firmware downloads in the field.

The DMA engine 226 preferably transfers data between the CPU and components of the system without interrupting the CPU. For example, CPU read and write operations as illustrated in CPU R/W block 218 are performed by the DMA engine 226.

The memory controller 234 preferably reads and writes video and graphics data to and from memory by using burst accesses with burst lengths that may be assigned to each task. The memory preferably is any suitable memory such as an SDRAM. All functions within the system preferably share the same memory having a unified memory architecture (UMA), with real-time performance of all of the hard real time functions. CPU accesses of code and data preferably are performed as quickly and efficiently as possible without impairing the video, graphics, and audio functions. Memory preferably is utilized very efficiently by performing burst accesses with burst lengths optimized for each task, and through careful optimization of the memory access patterns for MPEG video decoding.

The analog video decoder (VDEC) 236 preferably digitizes and processes analog input video to generate YUV component signals having separated luma and chroma components. The VDEC 236 preferably includes a 10-bit CMOS video analog-to-digital converter (ADC) to digitize analog video directly. The VDEC 236 may also include internal anti-aliasing filters which allow simple connections of normal analog video to the system. The VDEC 236 preferably separates luma and chroma using an adaptive 2H (3 line) comb filter, adaptive edge enhancement and noise coring.

The video-graphics display and scale engine 238 preferably takes graphics information from memory, blends the graphics information, and composites the blended graphics with video. The video-graphics display and scale engine preferably performs display sample rate conversion of the blended graphics so as to facilitate blending of graphics and video, while maintaining square aspect ratio of the graphics pixels.

The video-graphics display and scale engine 238 preferably supports capturing of video as illustrated in a capture block 220 and preferably reads graphics from the external memory, e.g., SDRAM, as illustrated in a graphics read block 222. Decoded MPEG video preferably is provided to the video-graphics display and scale engine as indicated in MPEG display feeder blocks 1 and 2 228, 230. The video-graphics display and scale engine preferably also receives a video window 232.

The video-graphics display and scale engine 238 preferably also performs both downscaling and upscaling of MPEG video and analog video as needed. The scale factors may be adjusted continuously from a scale factor of much less than one to a scale factor of four or more. With both analog and MPEG video input, either one may be scaled while the other is displayed full size at the same time. Any portion of the input may be the source for video scaling. To conserve memory and bandwidth, the video-graphics display and scale engine preferably downscales before capturing video frames to memory, and upscales after reading from memory. The video-graphics display and scale engine may scale both the HDTV video and the SDTV video.

In one embodiment, the video-graphics display and scale engine 238 provides HDTV video to be displayed while scaling the HDTV video down to SDTV format, and capturing into memory. The HDTV video may be scaled and captured as an SDTV video either before or after compositing with graphics. The HDTV video may also be scaled and captured as an SDTV video both before and after compositing with graphics. The scaled and captured HDTV video may be recorded, e.g., using a standard video cassette recorder (VCR), while the HDTV video is being displayed on television.

The video-graphics display and scale engine 238 preferably provides the component video, e.g., RGB, YPrPb and YCrCb, to the set of video DACs 240 for digital-to-analog conversion. In one embodiment, the set of video DACs 240 includes five DACs. The video-graphics display and scale engine 238 preferably provides the composite video, e.g., NTSC, PAL, Y/C video (S-video), to the VEC 254 for conversion into proper signal format. The VEC 254 preferably provides the formatted composite video to the set of video DACs 240 to be converted to analog format. In another embodiment, the VEC 254 includes a set of video DACs, and thus the formatted composite video is converted to analog video in the VEC 254.

The set of video DACs 240 preferably provide multiple digitized video outputs. The digitized video outputs may include component video such as RGB and YPrPb, in addition to composite video in various formats such as composite video blanking and sync (CVBS) including NTSC and PAL composite video, and Y/C video (S-video). In one embodiment, the set of video DACs 240 includes five video DACs, and thus all of Y/C video, CVBS video and standard definition component video may be displayed simultaneously.

A system bridge controller 248 preferably provides a "north bridge" function by providing a bridge for the CPU to interface with multiple peripheral devices. The system bridge controller preferably is comprised of the PCI (Peripheral Component Interconnect) bridge 242, the I/O bus bridge with DMA 244 and the CPU interface block 246.

The PCM audio 250 preferably receives decoded MPEG or Dolby AC-3 audio from the ADP 214. The PCM audio 250 preferably also receives I$^2$S audio through an I$^2$S input 262 and digitizes and captures it for mixing with other audio data. The PCM audio 250 preferably supports applications that create and play audio locally within a set top box and allow mixing of the locally created audio with audio from a digital audio source, such as the MPEG audio or Dolby AC-3, and with digitized analog audio.

The PCM audio 250 preferably plays audio from an SDRAM in a variety of sample rates and formats. Both the captured analog audio and the local PCM audio may be played and mixed at the same time, even though they may have different sample rates and formats. The PCM audio 250 preferably also provides digital audio output 276 in, e.g., SPDIF serial output format.

The audio DAC 252 provides the decoded and digital-to-analog converted MPEG and Dolby AC-3 audio component as an analog audio output 274 of the system. The analog audio output 274 may also include other audio information such as I$^2$S audio.

The VEC 254 converts between the HD video color space (YPrPb) and the standard definition YUV color space, and between either of those and RGB before converting to the respective outputs. For example, video that was originally coded using YPrPb may be displayed in YPrPb for direct HD output, or converted to YUV for SD display via composite, Y/C or direct RGB output. This function preferably is available regardless of the resolution of the video. Video that was originally coded using YUV may be output as composite, Y/C or RGB, or converted to YPrPb for direct HD output.

The HD YPrPb component output may support the specified tri-level sync. The RGB output may also support optional sync on green, sync on RGB, or separate H and V sync on 2 Y/CVBS and C outputs, to support various types of standard definition and HD monitors.

Figure 3:
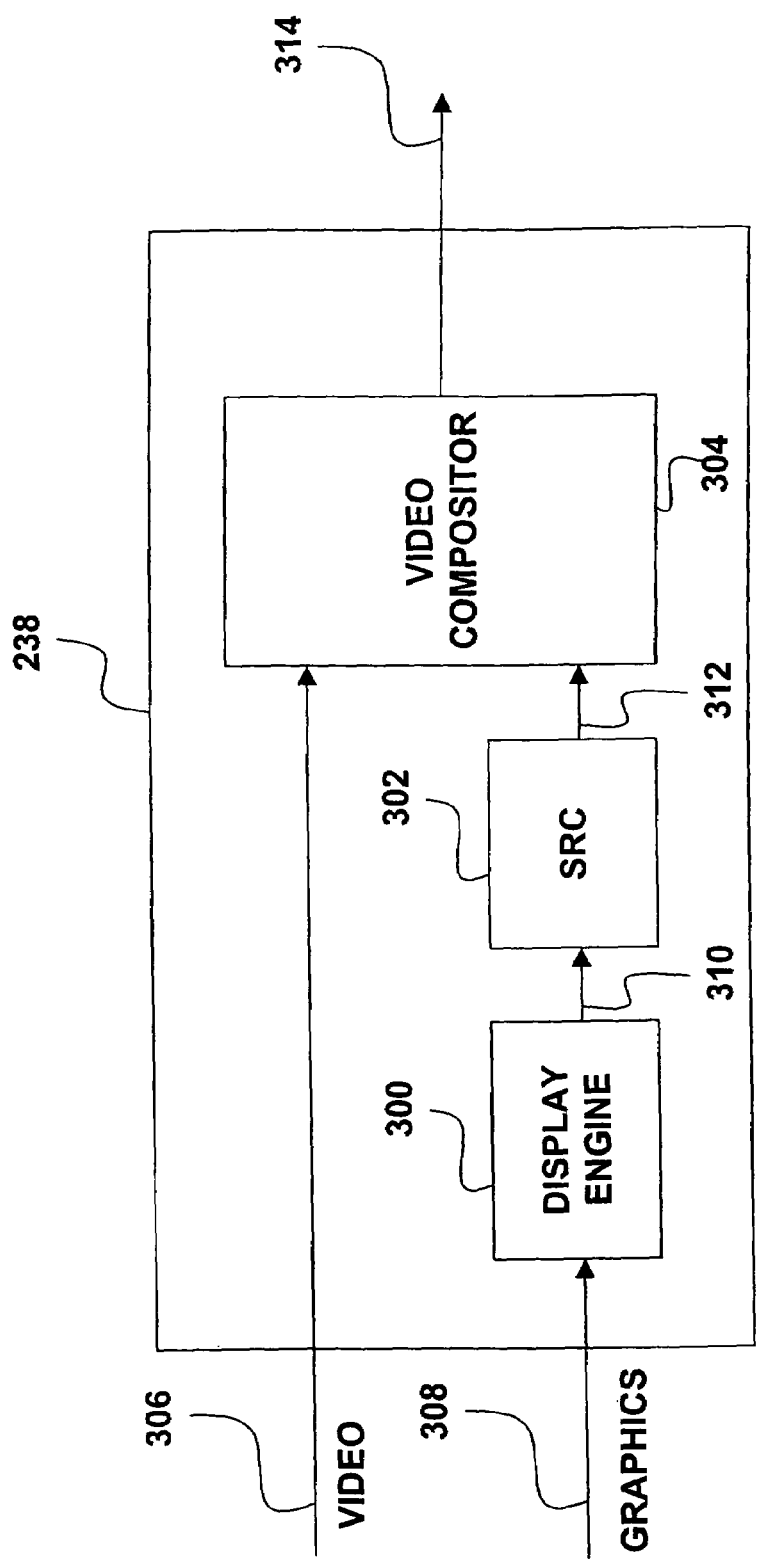
FIG. 3 is a block diagram of a video-graphics display and scale engine in an embodiment according to the present invention.

FIG. 3 is a block diagram of the video-graphics display and scaling engine 238 in one embodiment of the present invention. The video-graphics display and scaling engine includes a display engine 300, a sample rate converter (SRC) 302 and a video compositor 304. The video-graphics display and scaling engine may also include other components (not shown) for processing video and graphics. In other embodiments, the SRC may be included in the display engine.

The video-graphics display and scaling engine 238 preferably receives video signals 306 and graphics signals 308, and composites them to provide a video output 314. The video signals 306 preferably includes one or more MPEG display feeds and video windows, and may include either or both an HDTV video and an SDTV video. The graphics signals 308 may include graphics windows having various different formats such as YUV and RGB formats.

The display engine 300 preferably blends the graphics windows included in the graphics signals 308 to generate blended graphics 310. The SRC 302 preferably performs display sample rate conversion of the blended graphics to generate square graphics pixels 312. The video compositor 304 preferably composites the square graphics pixels 312 together with the video signals 306.

Any conventional or non-conventional display engine may be used as the display engine 300 for blending, filtering and scaling graphics. For example, one embodiment of the present invention incorporates the display engine used in one embodiment of the invention described in commonly owned U.S. patent application Ser. No. 09/641,374 filed Aug. 18, 2000 and entitled "Video, Audio and Graphics Decode, Composite and Display System," the contents of have been incorporated by reference.

The display engine 300 preferably provides the blended graphics 310 having an image size of 640×480 pixels and a display sample rate of 12.27 MHz to the SRC 302. The blended graphics have square graphics pixels that are provided to the SRC 302. The blended graphics 310 preferably are in YUV 4:2:2 format. Therefore, the blended graphics preferably include luma (Y) and chroma (U and V) component signals, and each graphics image in the blended graphics preferably includes 640×480 Y values, 320×480 U values and 320×480 V values. YUV may also be referred to as YCrCb or any other terminology used by those skilled in the art to designate video/graphics format having luma and chroma components. In other embodiments, the blended graphics 310 may be in other format, such as, for example, YUV 4:4:4 format.

In one embodiment, SRC preferably converts the sample rate of the blended graphics by 11/10 ratio to provide 704 pixels in each display scan line. In this embodiment, the SRC preferably converts Y, U and V values to 704×480 Y values, 352×480 U values and 352×480 V values. Other sample rate ratios may be used if either or both the video and the graphics have a different display sample rate. In other embodiments, for example, the sample rate of the blended graphics may be converted by 22/10 ratio to provide 1408 pixels per display scan line. For another example, different sample rate conversion ratios may be used if the video includes an HDTV video.

The SRC 302 preferably includes a multi-tap filter for the display sample rate conversion of all three of the Y, U and V values. For the display sample rate conversion with 11/10 ratio (e.g., down sampling by 10 and up sampling by 11), 11 phases, and therefore 11 coefficients preferably are used per tap. In one embodiment of the present invention, the multi-tap filter preferably has five taps. Therefore, in this embodiment, 55 coefficients are used to process Y (luma) components. In other embodiments, the SRC may include a multi-tap filter having a different number of taps, e.g., eight taps, and corresponding number of coefficients, e.g., 88, may be used. In other embodiments, the SRC may include a separate filter for processing each of the Y, U and V component signals. The SRC preferably also includes a memory for storing the filter coefficients. The memory may be a read only memory (ROM) or a random access memory (RAM).

The filter coefficients preferably are selected to provide a good balance of sharpness at the cut-off frequency, smoothness, anti-aliasing and minimum ringing. Design and implementation of multi-tap filters are well known to those skilled in the art. The 55 filter coefficients for processing luma components in the 11-phase, 5-tap filter in one embodiment of the present invention are provided in Table 1.

TABLE 1

Filter Coefficients to Process Luma Components for a 11-Phase, 5-Tap Filter

|  | Tap 0 | Tap 1 | Tap 2 | Tap 3 | Tap 4 |
|---|---|---|---|---|---|
| Phase 0 | −52 | 273 | 348 | −68 | 11 |
| Phase 1 | −34 | 195 | 415 | −79 | 15 |
| Phase 2 | −17 | 122 | 472 | −84 | 19 |
| Phase 3 | −2 | 58 | 514 | −79 | 21 |
| Phase 4 | 9 | 5 | 540 | −63 | 21 |
| Phase 5 | 17 | −36 | 550 | −36 | 17 |
| Phase 6 | 21 | −63 | 540 | 5 | 9 |
| Phase 7 | 21 | −79 | 514 | 58 | −2 |
| Phase 8 | 19 | −84 | 472 | 122 | −17 |
| Phase 9 | 15 | −79 | 415 | 195 | −34 |
| Phase 10 | 11 | −68 | 348 | 273 | −52 |

Each filter coefficient in Table 1 may be designated with a parameter c[ph] [t], where ph is the phase that ranges from 0 to 10, and t is the tap number that ranges from 0 to 4. For example, the value of the coefficient c[0] [0] is equal to −52 according to Table 1. For another example, the value of the coefficient c[6] [2] is equal to 540.

For example, in one embodiment of the present invention, pixel n in each row of the pixels that are input to the SRC has a luma value of $y_i[n]$, where n=0, 1, 2, . . . , 703. The phase ph preferably is selected to be (10×n) mod 11, and thus ph ranges from 0 to 10. The center pixel p of the five pixels provided to the five filter taps preferably is selected to be <(10×n)/11>, where <x> is defined to be the largest integer less than or equal to x. The center pixel p has a luma value of $y_i[p]$.

In this embodiment, the resulting Y values, i.e., $y_o[n]$s, for each scan line are generated using the following equation:

$$y_o[n] = \sum_{i=p-2}^{p+2} c[ph][i-(p-2)] \times y_i[i] \quad \text{(Eq. 1)}$$

Thus, for example, the Y value $y_o[300]$ of the output pixel 300 preferably is calculated from input Y values $y_i[270]$, $y_i[271]$, $y_i[272]$, $y_i[273]$ and $y_i[274]$, where the input pixel 272 is the center pixel. For the output pixel 300, for another example, ph equals to (10×300) mod 11, which is equal to 8.

It is not always possible to have two input values to the left and two input values to the right of the center pixel on the same scan line. For example, when the pixel 638 is used as the center pixel, the five input Y values to be provided to the 5-tap filter, according to Eq. 1, are $y_i[636]$, $y_i[637]$, $y_i[638]$, $y_i[639]$ and $y_i[640]$. However, images having 640× 480 pixels have input Y values ranging from $y_i[0]$ to $y_i[639]$, and $y_i[640]$ does not exist. For such cases, the right boundary input Y value may be duplicated so that all five taps of the 5-tap filter may be provided with an input Y value. For example, in this case, the input Y values of $y_i[636]$, $y_i[637]$, $y_i[638]$, $y_i[639]$ and $y_i[639]$ may be provided in which the right boundary input Y value of $y_i[639]$ is duplicated and used twice. Similar duplication of the boundary input Y value may be used at the left boundary as well.

Figure 4:
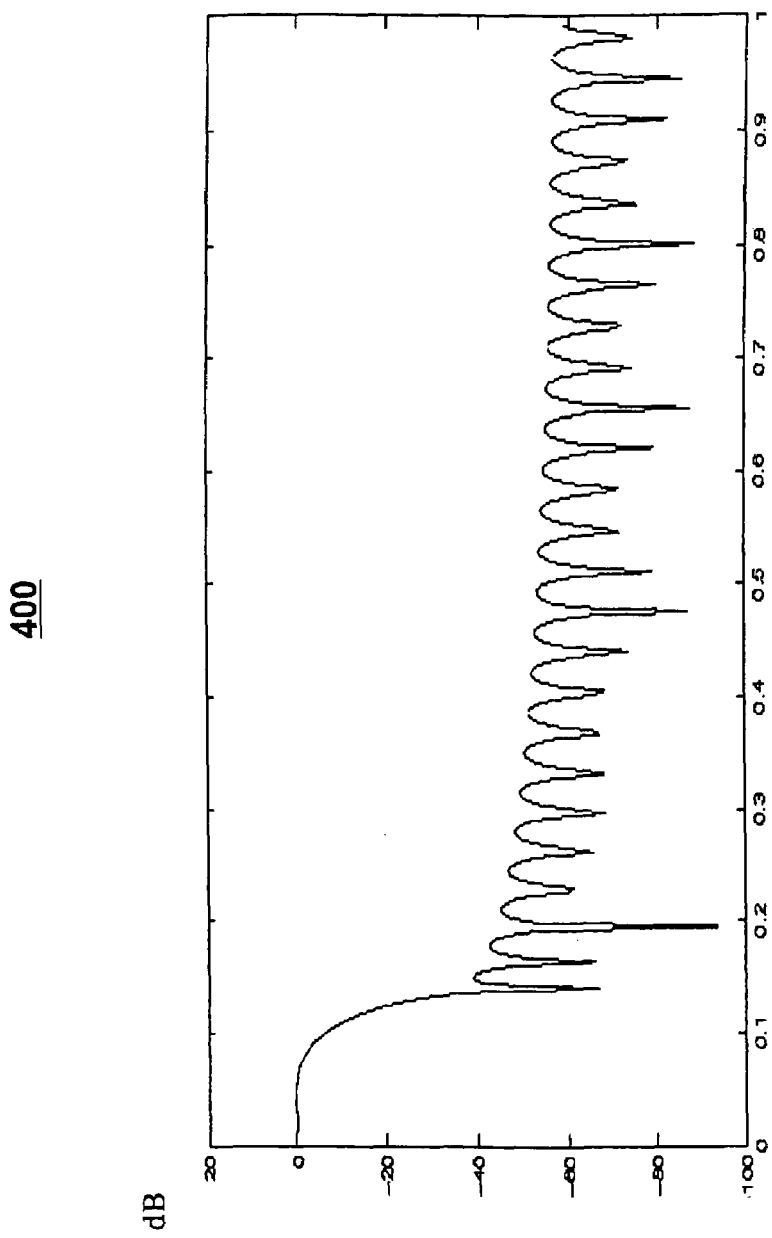
FIG. 4 is a frequency response diagram of a 11-phase, 5-tap filter for luma processing to generate square graphics pixels in an embodiment according to the present invention.

FIG. 4 is a diagram illustrating the frequency response of the 5-tap filter in one embodiment of the present invention. The abscissa is in units of a half of the sampling frequency. For example, the range of 0 to 1.0 on the abscissa corresponds to 0 Hz to 13.5 MHz for the case of luma component signals for ITU-R 601 compliant video. As can be seen from FIG. 4, the 5-tap filter preferably also performs low pass filtering as to reduce aliasing.

Since there are half as many U values and half as many V values as there are Y values in a YUV 4:2:2 image, in order to perform sample rate conversion using the same filter for all three values, different coefficients preferably are used for filtering U values and V values. For example, during the time Y has five input values including $y_i[0]$, $y_i[1]$, $y_i[2]$, $y_i[3]$ and $y_i[4]$, U may have three input values including $u_i[0]$, $u_i[2]$, $u_i[4]$, since there is only one value of U for every two values of Y in an YUV 4:2:2 image. Table 2 illustrates a frequency relationship between Y, U and V components of a YUV 4:2:2 image.

In other embodiments, there may be more or less number of input U and V values per input Y value. For example, each scan line in a YUV 4:4:4 image typically contains an identical number of input U and V values as the input Y value.

In one embodiment of the present invention, preferably a three tap filter is used to process input U values and input V values. The coefficients to be applied to the input U and V values may be derived from the coefficients for the input Y values, or they may be generated independently of the coefficients for the input Y values. For example, coefficients cc[ph][t] for the input U and V values may be derived from the coefficients c[ph][t] for the input Y values in accordance with the following equations:

$$cc[ph][0]=c[ph][0]+c[ph][1]; \quad \text{(Eq. 2)}$$

$$cc[ph][1]=c[ph][2]; \text{ and} \quad \text{(Eq. 3)}$$

$$cc[ph][2]=c[ph][3]+c[ph][4]. \quad \text{(Eq. 4)}$$

In equations 2-4, ph is the phase that ranges from 0-10, and therefore, there are 33 coefficients for the U and V input values. In another embodiment, different coefficients used for the input U values and the input V values may be different from one another.

There are twice as many pixels as there are U and V values in each YUV 4:2:2 image. Therefore, a parameter m should be designated for each group of two pixels in the graphics image, where m is defined to be <n/2> and m=0, 1, 2, . . . , 351. The phase ph preferably is selected to be (10×m) mod 11. The center pixel q of the input pixels for filtering preferably is defined to be <(10×m)/11>. The U and V component signals preferably are filtered in accordance with the following equations:

$$u_o[m]=cc[ph][0] \times u_i[q-2]+cc[ph][1] \times u_i[q]+cc[ph][2] \times u_i[q+2]; \text{ and} \quad \text{(Eq. 5)}$$

$$v_o[m]=cc[ph][0] \times v_i[q-2]+cc[ph][1] \times v_i[q]+cc[ph][2] \times v_i[q+2]. \quad \text{(Eq. 6)}$$

In other embodiments, a 5-tap filter, similar to the filter for the Y samples, may be used to filter the input U and V values. In these embodiments, the same or different coefficients may be applied to the input Y, U and V values. In order to use the 5-tap filter to process three input U values, additional values preferably are generated from existing values. For example, two of the three input U values may be duplicated and five values may be provided as $u_i[0]$, $u_i[0]$, $u_i[1]$, $u_i[1]$ and $u_i[2]$ or other similar sequence of U values. The in-between input U values may also be generated using other methods. For example, $u_i[0]$, $(u_i[0]+u_i[1])/2$, $u_i[1]$, $(u_i[1]+u_i[2])/2$, $u_i[2]$ may be used as the five input U values. Similarly, some input V values may be duplicated or in-between input V values may be generated in order to provide five input V values to the 5-tap filter concurrently with five input Y values.

In one embodiment of the present invention, images having a size 320×480 may be expanded to have a size of 704×480. The same 5-tap filter may be used for display sample rate conversion to generate output pixels for this

TABLE 2

| Y, U and V Frequency Relationship for a YUV 4:2:2 Image | | | | | | | | | |
|---|---|---|---|---|---|---|---|---|---|
| Y | $y_i[0]$ | $y_i[1]$ | $y_i[2]$ | $y_i[3]$ | $y_i[4]$ | $y_i[5]$ | $y_i[6]$ | $y_i[7]$ | $y_i[8]$ | $y_i[9]$ |
| U/V | $u_i[0]$ | $v_i[0]$ | $u_i[2]$ | $v_i[2]$ | $u_i[4]$ | $v_i[4]$ | $u_i[6]$ | $v_i[6]$ | $u_i[8]$ | $v_i[8]$ | embodiment. In this embodiment, since the images are to be scaled up by an 11/5 ratio, (e.g., down sampling by 5 and up sampling by 11) the phase ph preferably is selected to be (5×n) mod 11. All other aspects of the filtering algorithm preferably is similar to the foregoing embodiments for display sample rate conversion by 11/10 ratio.

As described above, one embodiment of the present invention provides a video and graphics system for HDTV and SDTV applications with a capability for displaying a combination of video and graphics where the video has non-square aspect ratio pixels, and the graphics content has square aspect ratio pixels.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents.

For example, the present invention may be applied to any system that uses sample rate conversion. For example, the present invention may be used for display sample rate conversion of graphics or other images to generate square aspect ratio pixels for applications in a 1080i-format HDTV with 1920×1080 pixels. For this application, Y, Pr and Pb component signals may be processed in a similar manner as the processing of Y, U and V (Y, Cr, Cb) component signals in the foregoing description. The present invention may also be used for a display sample rate conversion to generate display pixels for applications in HDTVs having progressive formats such as 720p and 1080p.

The invention claimed is:

1. A video and graphics system comprising:
a first input for receiving a graphics image comprising graphics pixels, the graphics pixels having square pixel aspect ratio;
a second input for receiving a video image comprising video pixels, the video pixels having non-square pixel aspect ratio, the video image having a larger number of pixels per scan line than the graphics image;
a sample rate converter for converting sample rate of the graphics image so that the number of graphics pixels per scan line of the graphics image becomes greater than or equal to the number of video pixels per scan line of the video image; and
a video compositor for blending the graphics image with the video image,
wherein the graphics image is scaled horizontally so that the graphics image can be overlaid on the full width of the video image, and the square pixel aspect ratio of the graphics pixels is maintained.

2. The video and graphics system of claim 1, wherein the sample reate converter includes a multi-tap filter for converting the sample rat of the graphics image.

3. The video and graphics system of claim 2 wherein the sample rate converter includes a memory for storing filter coefficients of the multi-tap filter.

4. The video and graphics system of claim 2 wherein the sample rate converter includes a memory for storing filter coefficients of the multi-tap filter.

5. The video and graphics system of claim 2 wherein the graphics image includes luma and chroma components, and the multi-tap filter is used to converter the sample rate for the luma and chroma components.

6. The video and graphics system of claim 4 wherein filter coefficients of the multi-tap filter are defined for converting the luma component, and wherein filter coefficients for the chroma components are derived from the filter coefficients for the luma component.

7. The video and graphics system of claim 2 wherein the graphics image includes luma and chroma components, and the multi-tap filter is used to convert the sample rate of the luma component, and wherein the vdeo and graphics system further comprises one or more other multi-tap filters for converting the sample rate of the chroma components.

8. The video and graphics system of claim 1, wherein the graphics image has a first image aspect ration and a first sample rate, and the video image has a second image aspect ratio and a second sample rate, and wherein the image aspect ration of the graphics image is changed to a third image aspect ratio when the sample ate of the graphics image is converted from the first sample rate to the second sample rate.

9. The video and graphics system of claim 7 wherein a conversion ratio for converting from the first sample rate to the second sample rate is 11/10.

10. The video and graphics system of claim 7 wherein a conversion ratio for converting from the first sample rate to the second sample rate is 11/5.

11. The video and graphics system of claim 1 wherein the video image includes an HDTV video image, and the sample rate of graphics image is converted to the sample rate of the HDTV video image.

* * * * *